United States Patent Office 3,647,740
Patented Mar. 7, 1972

3,647,740
FLUOROCARBON SILICONE COMPOSITIONS
Lorne A. Loree, Ogden R. Pierce, and Yung Ki Kim, Midland, Mich., assignors to Dow Corning Corporation, Midland, Mich.
No Drawing. Continuation-in-part of application Ser. No. 749,577, Aug. 2, 1968. This application June 23, 1970, Ser. No. 57,022
Int. Cl. C08g 51/04
U.S. Cl. 260—37 SB          25 Claims

ABSTRACT OF THE DISCLOSURE

Organosilanes and silanols of the forumla

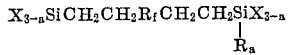

and siloxanes of the formula

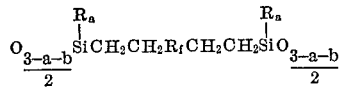

are disclosed. Examples of such compounds include

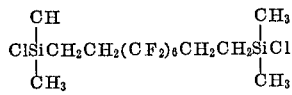

and

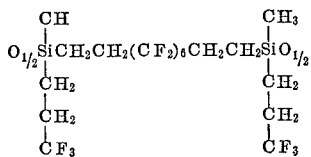

Certain polymers are particularly useful for making reversion resistant siloxane rubbers and resins.

---

This application is a continuation-in-part of application Ser. No. 749,577, filed Aug. 2, 1968, now U.S. Pat. 3,542,830.

This invention relates to novel fluorocarbon-containing silicone compositions. In one aspect the invention relates to polysiloxane elastomers having high temperature stability.

Organosiloxane elastomers, such as dimethylpolysiloxane rubber, are known to retain their elastomeric properties over a wide temperature range and because of this property have found application in a variety of environments. Siloxane rubber which contains fluorinated aliphatic radicals attached to the silicon atom, has recently been made available. This elastomer is resistant to swelling when in contact with automotive fuels, lubricating oils and the like.

One problem remaining in this area of elastomer technology is that of reversion or degradation of the polymer structure when the elastomer is confined in certain environments for long periods of time. For example, when used as sealants in aircraft fuel tanks some polysiloxane elastomers revert i.e., depolymerize, to the extent that their elastomeric properties are completely lost. In this type of use, retention of the elastomeric properties is critical and a high degree of reversion resistance is necessary.

It is an object of the invention to provide novel useful organosilicon compounds.

Another object of the invention is to provide a reversion resistant organosilicon elastomer which has the temperature stability and solvent resistance of known polysiloxane materials.

According to the invention there are provided silanes of the formula (I) 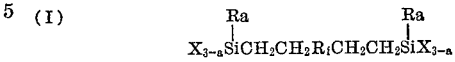

where:

X is the hydroxy or a hydrolyzable group,
R is a hydrogen atom, a monovalent hydrocarbon radical, or halohydrocarbon radical in which the halogen is Cl, Br or I or a R′CH$_2$CH$_2$—radical where R′ is a perfluoroaliphatic radical,
R$_f$ is a perfluoroalkylene radical, a perfluorocycloalkylene radical, a perfluoroalkylene radical or a perfluorocycloalkylene radical containing one or more C—O—C or C—S—C linkages; and $a$ independently has a value of from 0 to 3 inclusive, the sum of both $a$ values being not greater than 5.

Additionally, the invention provides siloxanes having at least one unit of the formula (II) 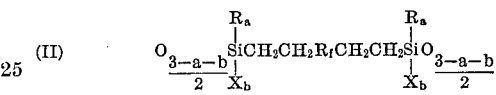

in which X, R an R$_f$ are as defined above; $a$ has a value of 0 to 3 inclusive; $b$ has a value of 0 to 3 inclusive; the sum of all $a$ and $b$ values being not greater than 5; any remaining siloxane units being of the formula

in which Z is a hydrogen atom, the hydroxy, a hydrolyzable group, or an organic radical attached to the silicon atom through an Si—C linkage; and $c$ has a value of from 0 to 3 inclusive.

The invention also includes polysiloxane elastomers comprising the above defined siloxane homopolymers or copolymers in combination with a filler. The elastomers of the invention can contain any suitable filler such as metal oxides, for example, titania, zinc oxide, ferric oxide and the like; siliceous materials, for example, clay, diatomaceous earth, crushed quartz and silicas, for example, fume silica, and silica aerogel. Carbon black is another suitable filler. If desired, the elastomers can also contain other materials such as compression set additives, pigments, oxidation inhibitors and other additives commonly used in organopolysiloxane rubbers.

The fillers can be employed in any desired amount ranging from 5 to 200 parts filler per 100 parts polymer. The amount of filler will vary with the type of filler and the properties desired in the finished elastomer. In sealant applications, it is preferred that the elastomer contain from 10 to 50 parts filler per 100 parts polymer.

The elastomers of the invention can be vulcanized by any of the known methods for vulcanizing organosiloxane rubber. One method comprises heating the compounded elastomer with an organic peroxide such as benzoyl peroxide, tertiary-butyl perbenzoate, dicumyl peroxide, and tertiary-butyl-peracetate. Preferably, the peroxides are employed in amounts from 0.1 to 10 weight percent based on the amount of siloxane polymer in the formulation. Another method of vulcanization is to incorporate olefinic radicals in the polysiloxane which provide crosslinking sites for the vulcanization process. As shown in the examples, this can be done forming a copolymer in accordance with the invention where Z is a vinyl or other olefinic radical.

Another method comprises mixing the instant polysiloxanes containing alkenyl groups with SiH containng siloxanes and a platium catalyst or by mixing the instant polymers containing SiOH groups with such room temperature active cross-linkers as alkoxy silanes, acetoxy silanes or SiH containing siloxanes with the appropriate metal catalysts such as tin salt of carboxylic acids.

In the silane compositions (1) of this invention, X can be any hydrolyzable group such as halogen atoms; such as fluorine, chlorine, and bromine; hydrocarbonoxy groups such as methoxy, ethoxy, octadecyloxy, allyloxy, cyclohexyloxy, phenoxy, tolyloxy, benzyloxy,

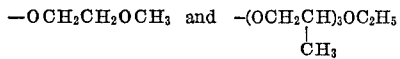

acyloxy groups such as acetoxy, propionyloxy, benzoyloxy, cyclohexyloxy, and

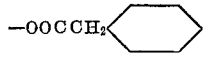

ketoxime groups such as —ON=C(CH$_3$)$_2$ and

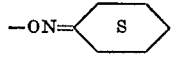

amine groups such as —NH$_2$—N(CH$_3$)$_2$ and

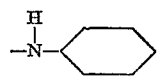

sulfide groups such as —SCH$_3$ and

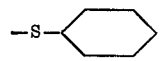

the nitrile group, the isocyanate group, sulfate groups such as

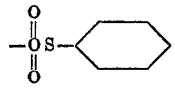

carbamate groups such as —OOCNHCH$_3$,

—OOCN(CH$_3$)$_2$ and —OOCN(C$_2$H$_5$)$_2$ and groups such as —ON(CH$_3$)$_2$ and —ON(C$_3$H$_7$)$_2$. "Hydrolyzable group" as used in this specification is defined as a group which is removed from the silicon atom by reaction with water at room-temperature.

R can be any monovalent hydrocarbon radical such as alkyl radicals such as methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl and 2,2-diethylpentyl; alkenyl radicals such as, vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals such as 1-penten-3-ynyl, 2-ethyl-1-buten-3-ynyl; cycloaliphatic radicals such as, cyclobutyl, cyclopentyl, cyclohexyl, cycloheptyl, propylcyclohexyl, 2,4-dimethylcyclopentyl, cyclohexenyl, bicyclo{3.1.0}hexyl, tricyclo{3.2.1.3,8}-5-nonenyl, spiro{4.5}decyl, dispiro{4.1.4.2}-1-tridecenyl, decahydronaphthyl, 2,3-dihydroindyl and 1,2,3,4-tetrahydronaphthyl; aryl radicals such as phenyl, tolyl, xylyl, 3-ethylphenyl, xenyl, naphthyl, anthracyl, pentacenyl, 3,4-methylethylphenyl, 9,9'-bifluoryl and 4-m-terphenyl; and aralkyl radicals such as 2-phenyl-octyl, 3-methyl-2-(4-isopropylphenyl)heptyl, benzyl, 2-ethyltolyl, 2-ethyl-p-cymyl, diphenylmethyl, 4,5-diphenylpentyl, 2-phenylethyl and 2-phenylpropyl.

When R is an unsaturated group it is best to add it to the silicon subsequent to the formation of the ≡SiCH$_2$CH$_2$R$_f$CH$_2$CH$_2$Si≡ structure. This can be done, for example, by reacting an unsaturated Grignard reagent (i.e. vinyl magnesium bromide) with SiCl. The same or different R groups can be attached to the same silicon atom.

R can also be any radical of the formula R'CH$_2$CH$_2$— in which R' is a perfluoroalkyl radical such as CF$_3$, C$_2$F$_5$, C$_8$F$_{17}$, C$_{10}$F$_{21}$, (CF$_3$)$_2$CF— or

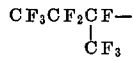

Substituents in which R' contains from 1 to 10 inclusive carbon atoms are preferred.

In addition, R can be any halohydrocarbon radical in which the halogen is chlorine, bromine or iodine, such as aliphatic groups, for example, chloromethyl, 3-chloropropyl, 3,3,3-trichloropropyl and chlorooctadecyl; aromatic groups, for example, dichlorophenyl, tetrabromoxenyl, tetrachlorophenyl, alpha,alpha,alpha-tribromotolyl and iodonaphthyl; cycloaliphatic groups, for example, chlorocyclohexyl, bromocyclopentyl and chlorocyclohexenyl and aralkyl groups, for example chlorobenzyl, beta-(chlorophenyl)ethyl, beta-(iodophenyl)ethyl and beta-(bromophenyl)propyl. R radicals, both hydrocarbon and halohydrocarbon, of from 1 to 18 inclusive carbon atoms are preferred.

The R$_f$ radical can be any suitable perfluoroalkylene radical for example —CF$_2$—, —C$_2$F$_4$—, —C$_5$F$_{10}$—, —C$_7$F$_{14}$—,

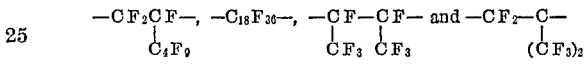

including any perfluorocycloalkylene radical, such as

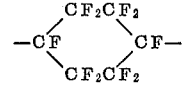

The R$_f$ radical can also contain one or more C—O—C or C—S—C units, for example, —CF$_2$—O—CF$_2$—, —CF$_2$CF$_2$—S—CF$_2$—,

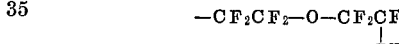

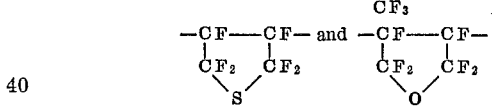

R$_f$ radicals of from 1 to 20 inclusive carbon atoms are preferred and, for reasons of economy, perfluoroalkylene radicals of from 1 to 6 inclusive carbon atoms are especially preferred.

The silanes (I) of the invention are best prepared by reacting silanes of the formula

with an alpha,omega-perfluoroalkene (CH$_2$=CHR$_f$CH=CH$_2$)

in the presence of a platinum catalyst, such as chloroplatinic acid, or a peroxide catalyst in the conventional manner for adding SiH compounds to compounds having terminal CH$_2$=CH— groups. The peroxide-catalyzed addition, for example, using di-t-butylperoxide, is preferred because of the high yield obtained. The olefinic intermediates are prepared by addition of ethylene to BrR$_f$Br followed by dehydrobromination of the resulting adduct. Ethylene addition to BrR$_f$Br where R$_f$ contains at least 4 carbon atoms is especially desirable since a high yield of CH$_2$=CHR$_f$CH=CH$_2$ is obtained. Bromine addition to perfluoro-beta-oxa or thiaglutaric acids provides the dibromide precursor for the compounds of the invention which contain C—O—C or C—S—C bonding.

The silanols of the invention (i.e. where X is the hydroxy group) are best prepared by hydrolyzing the corresponding hydrolyzable silanes under neutral conditions by any of the methods well-known in the art. The preferred method of silanol preparation is by hydrolysis of those compounds in which X is a methoxy group.

The siloxanes (II) of the invention can be prepared by partial or complete hydrolysis or cohydrolysis of the above-defined silanes by conventional means, or by cohydrolysis of the above silanes with silanes of the formula

where Z, X and c are as defined above. The particular method chosen for the hydrolysis or cohydrolysis can vary widely depending upon the nature of the substituent groups on the silicon atom. Thus, there are no critical conditions other than the well-known methods for hydrolyzing and cohydrolyzing silanes.

Another method of preparing the siloxanes of the invention is by the addition of $CH_2=GHR_fCH=CH_2$ to siloxanes containing SiH groups in the presence of platinum catalysts. The conditions for carrying out this reaction are the same as those normally employed in the addition of SiH-containing siloxanes to olefins.

As described above, the siloxanes can be homopolymers or they can be copolymers having various perfluoroalkylene-containing siloxane units. In addition the siloxanes of the invention can contain siloxane units of the formula

where c has a value of from 0 to 3 inclusive. These included units of the type $SiO_2$, $ZSiO_{3/2}$, $Z_2SiO$ and $Z_3SiO_{1/2}$. The same or different Z groups can be bonded to the same silicon atom.

Z can be a hydrogen atom, a hydroxyl group, any of the above defined hydrolyzable groups (X) or an organic radical attached to the silicon through an Si—C linkage, such as any of the monovalent hydrocarbon radicals, preferably of 1 to 18 inclusive carbon atoms, specifically shown for R above; divalent hydrocarbon radicals, for example methylene, dimethylene, $-CH_2CH=CHCH_2-$ and octadecamethylene; arylene radicals, for example, phenylene, xenylene, tolylene, xylylene and naphthylene; and cycloalkylene radicals such as cyclohexylene and cyclopentylene. Z can also be any halohydrocarbon radical, such as described with respect to R or the above described $R'CH_2CH_2-$ radical.

Also included within the scope of the invention are siloxanes as described above which have olefin-containing siloxane units, such as

The methylvinylsiloxane units are especially preferred. These olefin-containing siloxane units are usually present in amount in the range of from 0.1 to 10 mole percent to provide cross-linking sites in the polymer.

The siloxanes of the invention are fluids, resins and elastomeric materials. The resin forms a hard film and can be used as a coating composition. The elastomers have particularly utility as sealants in high temperature environments and have a high resistance to degradation upon exposure to radiation and the fluids are useful as lubricants.

The following examples are illustrative of the invention which is delineated in the claims.

EXAMPLE 1

(A) A solution of 106.2 g. (0.3 mole) of

528 g. (3.0 moles) of

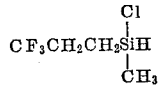

and 3 g. of di-t-butylperoxide was heated under reflux. As the reaction proceeded the reaction temperature increased from about 104° C. to 107° C. At the end of 72 hours of reflux, gas chromatographic analysis of the reaction mixture showed the presence of the di-adduct as the major component. Distillation of the reaction mixture gave, after recovery of the excess silane, 192 g. of

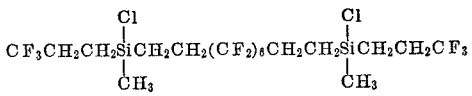

which had a boiling point of 160 to 162° C./1 mm. Hg, melting point of 41 to 42° C., and a neutralization equivalent of 351 (calc. 353).

(B) $CH_2=CH(CF_2)_6CH=CH_2$ and $Cl_2(CH_3)SiH$ were reacted in a similar manner to obtain a high yield of

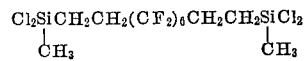

which had a boiling point of 130 to 131° C. at 0.65 mm. Hg and a melting point of 51.5 to 52.5° C.

(C) $CH_2=CH(CF_2)_6CH=CH_2$ and $Cl_3SiH$ were reacted in a manner similar to (A) and (B) to give a high yield of $Cl_3SiCH_2CH_2(CF_2)_6CH_2CH_2SiCl_3$ which had a B.P. of 150 to 152° C./.75 mm. Hg and a melting point of 62° C.

EXAMPLE 2

Into a stirred solution of 12 g. of sodium bicarbonate in 150 ml. of water, there was added slowly a solution of 4 g. of $Cl_2Si(CH_3)CH_2CH_2(CF_2)_6CH_2CH_2Si(CH_3)Cl_2$ in 100 ml. of diethylether at room-temperature. After the addition was complete, the mixture was stirred for about 15 minutes at room-temperature. Then the ether layer was separated, washed with aqueous hydrochloric acid, twice with water, and dried. Ether was evaporated at room-temperature, and the resulting solid hydrolyzate was taken into 10 ml. of ethylene glycol dimethylether. Four drops of a catalyst consisting of a solution of 1 mol of tetramethyl guanidine in three mols of trifluoroacetic acid were mixed into the solution. The solvent was then removed at room-temperature. The resulting partially cured resin was further cured in an air circulating oven at 100° C. for 96 hours to give a hard, tough, smooth-surfaced hydroxyl end-blocked resinous polymeric composition of the unit formula

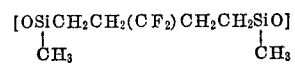

EXAMPLE 3

About 12 g. of $Cl_3SiCH_2CH_2(CF_2)_6CH_2CH_2SiCl_3$ was taken into 100 ml. of diethylether and hydrolyzed as described in Example 2 above. The ether insoluble, partially condensed solid hydrolyzate was removed by filtration, and the ether layer was separated, washed with aqueous (5%) hydrochloric acid, twice with water, and dried. The ether solution was evaporated at room-temperature to a volume of 10 ml. Two drops of a solution of tetramethylguanidine in trifluoroacetic acid (1:3 mols) were added and mixed with the ether solution. The solvent was evaporated from the resulting solution at room-temperature. The resulting partially cured resin was heated at 150° C. in an air-circulating oven for 0.5 hour to yield a hard strong thin film of $[O_{1.5}SiCH_2CH_2(CF_2)_6CH_2CH_2SiO_{1.5}]_x$.

EXAMPLE 4

Following the procedure outlined in Example 3 above, a mixture of 1.5 g. of $Cl_2Si(CH_3)CH_2CH_2(CF_2)_6CH_2CH_2Si(CH_3)Cl_2$ and 2 g. of $Cl_3SiCH_2CH_2(CF_2)_6CH_2CH_2SiCl_3$ was hydrolyzed, and the ether soluble portion of the hydrolyzates was co-condensed to give a clear, strong, thin film of the copolymer having the formula

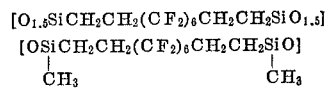

EXAMPLE 5

Following the procedure outlined in Example 2, a mixture of 2 g. of

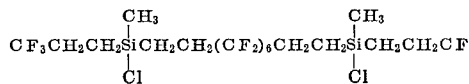

and 4 g. of $$Cl_2Si(CH_3)CH_2CH_2(CF_2)_6CH_2CH_2Si(CH_3)Cl_2$$

was hydrolyzed and co-condensed to yield a tough, strong and flexible film of the copolymer

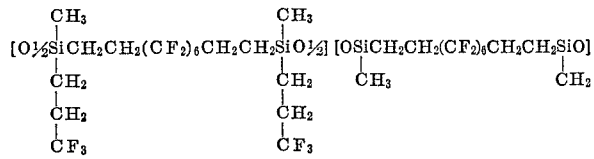

EXAMPLE 6

Following the procedure outlined in Example 2 above, a mixture of 4 g. of

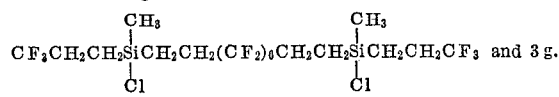

of $Cl_2(CH_3)SiCH_2CH_2(CF_2)_6CH_2CH_2Si(CH_3)Cl_2$ was hydrolyzed and co-condensed to yield a flexible, tough and smooth copolymeric resin of about 2 to 3 mm. in thickness of the formula

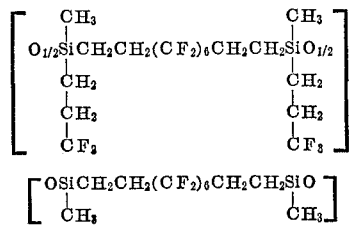

EXAMPLE 7

A mixture of 142 g. (0.55 mole) of $$(CF_3CH_2CH_2)_2SiHCl$$

24 g. (0.06 mole) of $CH_2{=}CH(CF_2)_6CH{=}CH_2$, and 1 g. of ditert-butyl peroxide was heated at 110 to 120° C. under an atmosphere of dry nitrogen. At the end of about 40 hours of heating, the reaction was stopped, and the mixture was distilled to yield 42 g. (78% yield) of

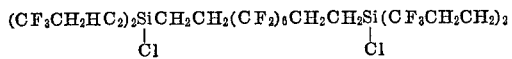

B.P. 192 to 193° C. (0.3 mm. Hg), M.P. 81 to 82° C.

When this compound is hydrolyzed and condensed according to the procedure of Example 2, a siloxane of the unit formula

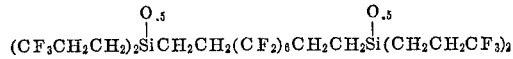

is obtained.

EXAMPLE 8

Following the procedures outline in the Example 1 above,

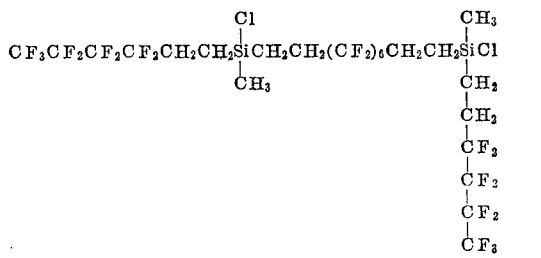

was obtained having a boiling point of 182° C. (0.3 mm.) and a melting point of from 61 to 62° C.

EXAMPLE 9

The hydrolyzate arising from the hydrolysis of 27 g.

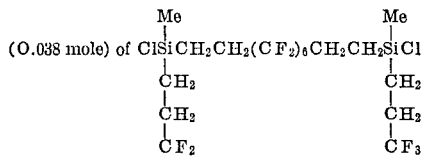

was condensed at 100° C. using 4 drops of a solution of tetramethylguanidine-trifluoroacetic acid. When the viscosity of the polymer reached about 10,000 cs. (after about 20 min.), a solution of 50 ml. of

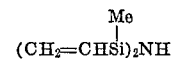

in 100 ml. of ethylene glycol dimethylether was added at once to the polymer while stirring at 100° C. The reaction mixture was stirred at 100° C. for 22 hours, and then stripped to remove the solvent. The resulting product formed two layers. The upper layer was decanted, and teh viscous liquid polymer (the bottom layer) was taken into about 20 ml. of ether. The ethereal solution was washed with about 10% aqueous hydrochloric acid, saturated aqueous sodium bicarbonate, water and dried. After evaporation of ether, the resulting olefin-containing polymer was placed under about 0.1 mm. Hg pressure at 150° C. for 15 hours to remove any volatile material. The viscous fluid polymer was found to crosslink well. The molecular weight of the polymer was about 10,700 and it was of the formula

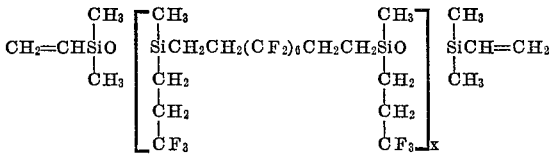

EXAMPLE 10

About 55 g. of the hydrolyzate of

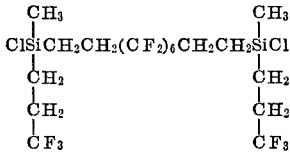

was taken into a solution of 50 ml. of $CH_3CN$ and 0.5 ml. of water. Dry ammonia was bubbled into the homogeneous solution for about 30 sec. The mixture was then placed in a shaker at room-temperature for 12 hours. The resulting mixture was placed under about 0.75 mm. Hg pressure at room-temperature for 4 hours, then at 100° C. for 4 hours. The resulting polymer was viscous fluid having a molecular weight of about 7,000 and a hydroxy content of 0.39 weight percent of the unit formula

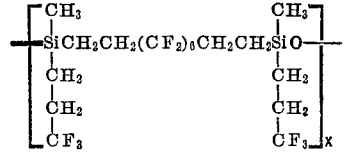

EXAMPLE 11

A mixture of 25 g. of the hydrolyzate of

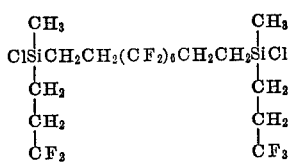

and 0.45 g. of

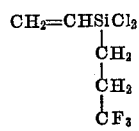

was heated at 100° C. while stirring under a stream of dry nitrogen. After one hour of heating, three drops of a solution of tetramethylguanidine in trifluoracetic acid (1:3) was introduced and the heating (100° C.) were continued, while stirring, for 2 hours. The resulting polymer was kept under about 1 mm. Hg pressure at 100° C. for about 16 hours. The polymer was an elastomeric material. The molecular weight was found to be about 90,000. The $F^{19}$ and $H^1$, N.M.R. and infrared spectra of the polymer were in agreement with the following polymer structure:

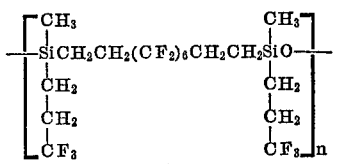

containing in the polymer chain small amounts of the vinyl crosslinking sites as:

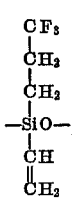

(A) Following the procedure described above, the following high consistency polymer was also prepared.

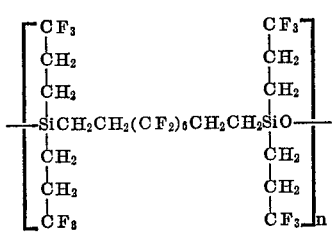

containing about 1 mole percent of the vinyl crosslinking sites as

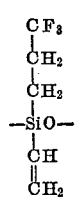

(B) The following polymer was obtained in like manner,

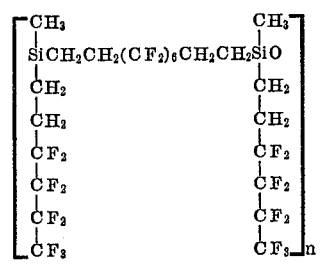

containing about 1 mole percent of the vinyl crosslinking sites as

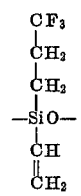

EXAMPLE 12

The hydrolyzate arising from the hydrolysis of 80 g. of

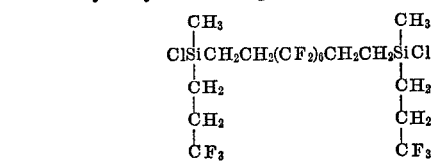

was dissolved in an equal volume of tetrahydrofuran. 5 drops of a solution of tetramethylguanidine in trifluoroacetic acid (1:3) were added and the solution was refluxed for 3 hours. About 60 g. of $[(CH_3)_3Si]_2NH$ was added to the reaction mixture and the mixture was heated under reflux for 20 hours. The solvent and excess $[(CH_3)_3Si]_2NH$ were removed under vacuum, and the resulting product was taken into ether. The ethereal solution was washed with a 5% aqueous hydrochloric acid, saturated sodium bicarbonate solution and dried. After removal of ether under vacuum at room-temperature, the viscous fluid was stripped at 150° C. under about 0.1 mm. Hg pressure to yield a clear viscous fluid. The viscosity of the fluid was about 150 cs. The elemental analysis and spectral data were in agreement with the polymer structure.

Distillation of the fluid prepared above gave

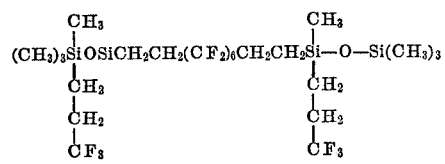

having a B.P. 140° C. (0.75 mm.), $n_D^{25}$ 1.3775 and a higher viscosity fluid.

EXAMPLE 13

About 15 g. (0.0212 mole) of

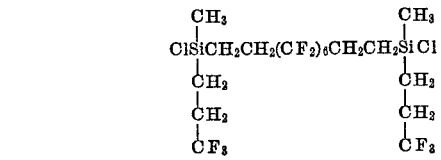

was hydrolyzed using an aqueous sodium bicarbonate-ether system. The dried ethereal solution containing monomer diol

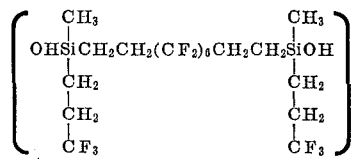

was added to 9 g. (0.0291 mole) of

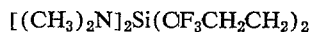

while stirring. The solution was then heated under reflux for 20 hours. The ethereal solution was then filtered. The ether and excess $[(CH_3)_2N]_2Si(CF_3CH_2CH_2)_2$ were removed under vacuum. The resulting viscous fluid was taken into ether and washed with a 5% aqueous hydrochloric acid, water and then dried. The ether was evaporated, and the fluid polymer was condensed using a catalytic amount of tetramethyl guanidine-tri fluoroacetic acid solution to yield the following gummy copolymer:

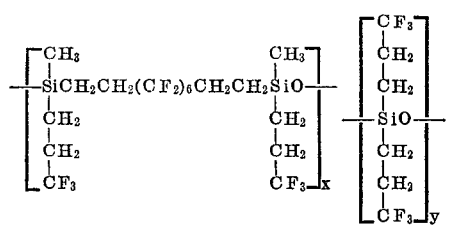

EXAMPLE 14

A mixture of 31 g. (0.046 mole) of

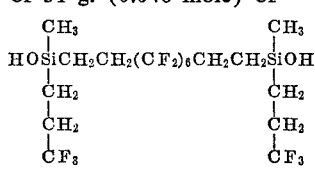

8.2 g. (0.023 mole) of

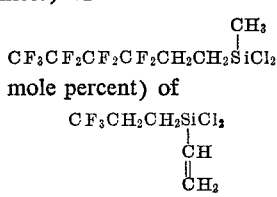

and 0.16 g. (1 mole percent) of

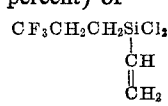

was stirred at 100° C. overnight under a stream of dry nitrogen. The resulting viscous fluid was taken into ether, and the ethereal solution was washed with saturated sodium bicarbonate, a 5% aqueous hydrochloric acid, water, and then dried. After removal of ether, the resulting prepolymer was condensed using 5 drops of a solution of tetramethyl guanidine in trifluoroacetic acid (1:3) at 100° C. The polymerization was conducted under vacuum with stirring. The prepolymer turned to a gummy elastomer within 30 minutes. The polymerization was continued overnight. The resulting copolymer was an elastomeric gum of the average formula

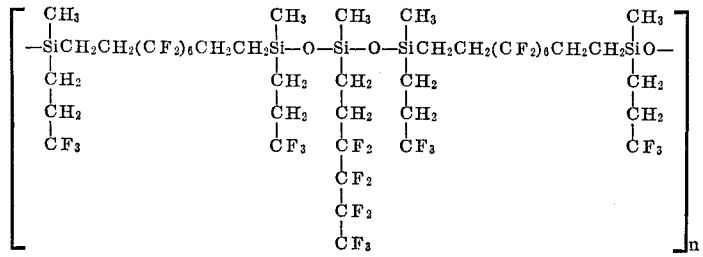

containing about 1 mole percent of the vinyl crosslinking sites as:

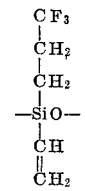

Following the procedure outlined above, the same molar amounts of

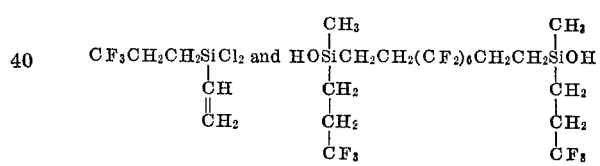

were reacted with 0.23 mole of

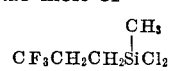

to yield the copolymer of the average formula

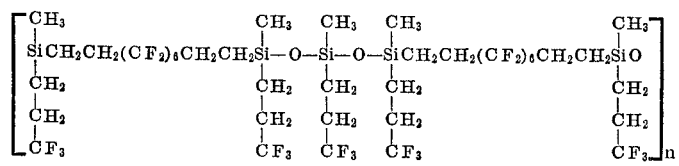

which contained about 1 mole percent of vinyl crosslinking sites as

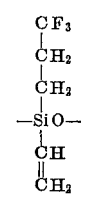

EXAMPLE 15

When $CH_2=CH(CF_2)_2—O—(CF_2)_2CH=CH_2$ and $Cl_3SiH$ are heated in the presence of di-t-butylperoxide the following product is obtained:

$Cl_3SiCH_2CH_2(CF_2)_2—O—(CF_2)_2CH_2CH_2SiCl_3$

This product can be hydrolyzed by the method set forth in Example 2 to yield a strong flexible polymer of the unit formula:

$$O_{1.5}SiCH_2CH_2(CF_2)_2-O-(CF_2)_2CH_2CH_2SiO_{1.5}$$

EXAMPLE 16

When 2,2,5,5-tetrafluoro-3,4-dichlorothiolene-3 is reacted with a conventional oxidizing agent, such as potassium permanganate, perfluoro-β-thiaglutaric acid is obtained. The reaction is as follows:

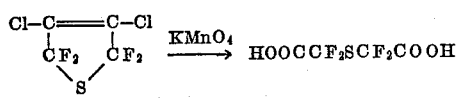

Bromination of the thiaglutaric acid yields $BrCF_2SCF_2Br$ which is reacted with ethylene and dehydrobrominated to provide $CH_2=CHCF_2SCF_2CH=CH_2$. Reaction of this product with $Cl_2(CH_3)SiH$ in the presence of a peroxide catalyst such as di-t-butylperoxide, gives the following silane:

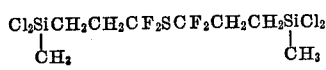

Hydrolysis and condensation of this silane as shown in Example 15 produces a siloxane of the unit formula

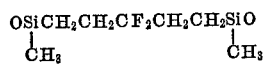

EXAMPLE 17

When

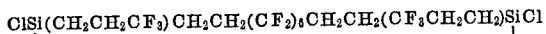

is hydrolyzed in aqueous sodium bicarbonate solution and condensed by the addition of tetramethyl guanidine in trifluoroacetic acid solution, the following polymer is obtained:

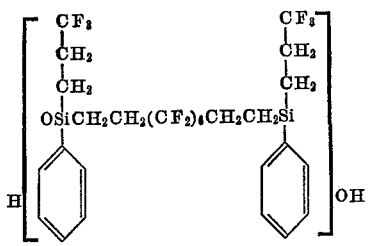

EXAMPLE 18

When a solution of 1 mole $CH_2=CH(CF_2)_{14}CH=CH_2$ 10 moles of

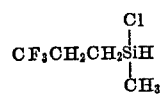

and a catalytic amount of di-t-butylperoxide is heated under reflux, the reaction mixture, after distillation of excess silane, contains as a major component the following product:

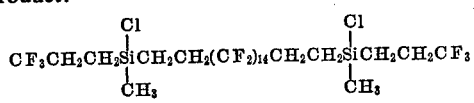

When this material is hydrolyzed and condensed with tetramethyl guanidine-trifluoroacetic acid solution a siloxane of the unit formula

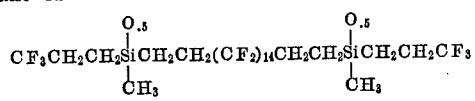

is obtained.

EXAMPLE 19

A high visocosity polymer fluid of the following comcomposition

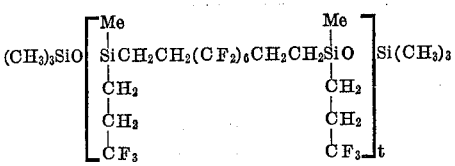

was prepared as shown in Example 12.

This polymeric material had a viscosity of 856 cs. when measured at 77° F. To determine its suitability as a lubricant, the material was tested by the 4-ball method in which a one-half inch steel ball is rotated against three stationary one-half inch steel balls and the length and width of the scar on each stationary bearing is measured. Test conditions and results are tabulated below:

4-BALL TEST CONDITIONS

| Temp. (° F.) | Speed (r.p.m.) | Time (hrs.) | Load (kg.) | Scar diam. (mm.) |
|---|---|---|---|---|
| 400 | 1,020 | ½ | 20 | 0.36 |
| 167 | 1,200 | 1 | 4 | 0.18 |
| 167 | 1,200 | 1 | 10 | 0.26 |
| 167 | 1,200 | 1 | 40 | 0.72 |

The results show the polymer fluid to be a highly effective lubricant.

EXAMPLE 20

(A) 100 parts by weight of a hydroxyl-endblocked copolymer containing 99.5 mol percent of

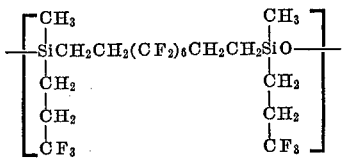

and 0.5 mol percent of

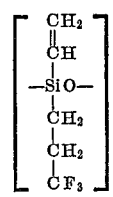

units were compounded with 40 parts by weight of fume silica (filler), 17 parts by weight of

fluid (plasticizer), 2 parts by weight ferric oxide (stabilizer) and 0.5 weight percent di-tertiarybutyl peroxide (catalyst). This formulation was cured at 200° C. for 8 hours.

(B) 100 parts by weight of a hydroxyl-endblocked copolymer of 98 mol percent of

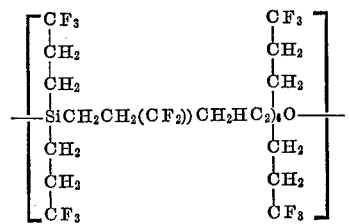

units and 2 mol percent of

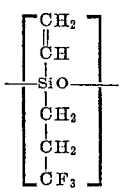

units were compounded with the same materials in the same amounts as was formulation (A). This elastomer was also cured at 200° C. for 8 hours.

The physical properties of the elastomers are given below:

| Elastomer | Shore "A" durometer | Tensile, p.s.i. | Elongation, percent | Tear strength,[1] lb./in. | Percent swell in toluene |
|---|---|---|---|---|---|
| A | 68 | 1,905 | 360 | 131 | 33 |
| B | 66 | 675 | 175 | 71 | 15 |

[1] Measured according to the procedure of ASTM D-624-54, Die B.

This data demonstrates the elastomeric properties and low swell characteristics of rubber formulated in accordance with the invention.

EXAMPLE 21

A separate sample (1) of the formulation shown in Example 20 (A) was prepared and cured for 8 hours at 200° C. After curing the properties were determined. The sample was then placed in a dry test bomb and maintained at 250° C. for 24 hours. The samples were again tested to determine the degree of retention of physical properties.

For purposes of comparison the same tests were run on a sample (2) of trifluoropropylmethylpolysiloxane rubber having properties of the same magnitude. This siloxane elastomer is described in U.S. 3,179,619. Test results are tabulated below:

| | After cure at 200° C. for 8 hours | | | Cured rubber after being maintained at 250° C. for 24 hours | | |
|---|---|---|---|---|---|---|
| Sample | Shore "A" durometer | Tensile, p.s.i. | Elongation, percent | Shore "A" durometer | Tensile, p.s.i. | Elongation, percent |
| 1 | 56 | 1,270 | 370 | 56 | 860 | 290 |
| 2 | 45 | 1,500 | 350 | 27 | 50 | 100 |

This example shows that the elastomers of the invention retain their physical properties under severe temperature conditions to a greater degree than elastomers of the prior art. It is evident that the elastomers of the invention resist reversion to a much greater extent than the conventional organopolysiloxane elastomer.

EXAMPLE 22

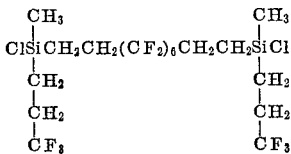

was hydrolyzed and condensed by the procedure outlined in Example 2 to yield a hydroxyl endblocked polymer of

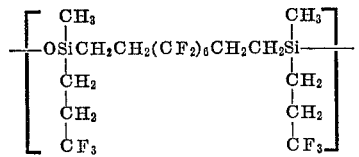

This polymer, having a gum-like viscosity, was compounded into a sealant of the following formulation: 100 parts by weight polymer, 13 parts by weight triacetoxy vinylsilane (cross-linking agent) 0.5 part by weight dibutyl tin diacetate (catalyst), 5 parts by weight carbon black (stabilizer), and 10 parts by weight fume silica (filler) which had been treated with the cyclic trimer of trifluoropropylmethylsiloxane. Evaluation of this sealant is described below.

For purpose of comparison, a hydroxyl-endblocked polymer of trifluoropropyl methylsiloxane units was compounded with the same amounts of the same materials shown in the above formulation. This polymer was prepared by polymerization of the cyclic trisiloxane in the presence of alkaline catalyst. The polymer had a viscosity of 47,000 cs. at 25° C.

Both sealants were compounded on a three-roll mill and allowed to cure by exposing them to the atmosphere for one week at room temperature.

In order to evaluate reversion resistance in a fuel tank-type of environment both samples were placed in a covered kettle to which a reflux condenser was attached. Three liters of jet fuel (JP-4), containing paraffin wax to raise its boiling point, were introduced into the vessel along with 3 liters of air. The temperature of the fuel was maintained at 450° F. Each week the fuel was changed following this same procedure. The samples were maintained in this high temperature fuel environment for several weeks.

Visual observation of the samples each week showed the sealant of the invention to become progressively stronger while retaining its elastomeric properties. The conventional sealant remained serviceable but became softer and weaker as the test continued. At the end of 15 weeks the sealant of the invention was in excellent condition. After 16 weeks it was noted that water had leaked into the reflux condenser and had run down into the fuel vessel. The samples were examined and it was found that the trifluoropropylmethylsiloxane elastomer was degraded to the extent that substantially all elastomeric properties were lost; the material had softened to a tarry consistency. The elastomer formulation based on the perfluoroalkylene-bridged polymer was not noticeably affected.

That which is claimed is:
1. A siloxane having at least one unit of the formula

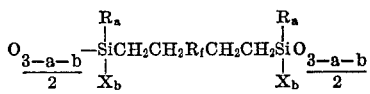

in which:
X is the hydroxy or a hydrolyzable group,
R is a hydrogen atom, a monovalent hydrocarbon radical, a monovalent halohydrocarbon radical in which the halogen is Cl, Br or I, or a R'CH$_2$CH$_2$— radical where R' is a perfluoroaliphatic radical,
R$_f$ is a perfluoroalkylene radical, a perfluorocycloalkylene radical or a perfluoroalkylene radical or a perfluorocycloalkylene radical containing one or more C—O—C or C—S—C linkages, said R$_f$ radical containing no more than 20 carbon atoms, and each
$a$ has a value of from 0 to 3 inclusive, and
$b$ has a value of from 0 to 3 inclusive, the sum of all $a$ and $b$ values being not greater than 5; any remaining siloxane units being of the formula

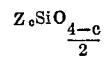

in which:
Z is a hydrogen atom, the hydroxy or a hydrolyzable group, a monovalent hydrocarbon radical, a divalent hydrocarbon radical, a monovalent halohydrocarbon radical in which the halogen is Cl, Br or I or a

R'CH₂CH₂— radical wherein R' is a perfluoroaliphatic radical, and $c$ has a value of from 0 to 3 inclusive.

2. The siloxane of claim 1 wherein R is selected from the group consisting of monovalent hydrocarbon radicals of from 1 to 18 inclusive carbon atoms and R'CH₂CH₂— radicals wherein R' is a perfluoroalkyl radical of from 1 to 10 inclusive carbon atoms.

3. The siloxane of claim 2 wherein Z is a monovalent hydrocarbon radical of from 1 to 18 inclusive carbon atoms.

4. The siloxane of claim 3 wherein $R_f$ is a perfluoroalkylene radical of from 1 to 20 inclusive carbon atoms.

5. The siloxane of claim 4 wherein $R_f$ is a perfluoroalkylene radical of from 1 to 6 inclusive carbon atoms.

6. The siloxane of claim 1 wherein $R_f$ is a perfluoroalkylene radical containing one or more C—O—C or C—S—C linkages.

7. The siloxane of claim 6 wherein $R_f$ is a

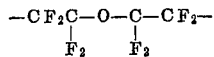

radical.

8. The siloxane of claim 6 wherein $R_f$ is a

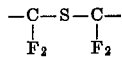

radical.

9. The siloxane of claim 1 wherein $R_f$ is a perfluorocycloalkylene radical.

10. The siloxane of claim 1 wherein $R_f$ is a perfluorocycloalkylene radical containing one or more C—O—C or C—S—C linkages.

11. The siloxane of claim 1 in which essentially all of the units are of the formula

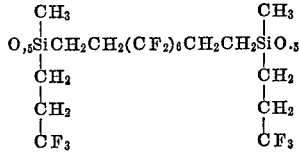

12. The siloxane of claim 1 having the formula $$O_{3/2}SiCH_2CH_2(CF_2)_6CH_2CH_2SiO_{3/2}$$

13. A siloxane in accordance with claim 5 consisting essentially of units of the formula

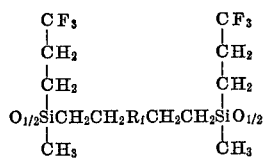

having vinyldimethylsiloxy terminal groups.

14. A siloxane in accordance with claim 1 consisting essentially of units of the formula

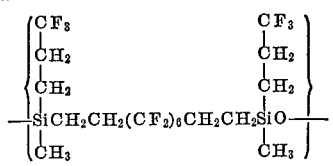

and containing from 0.1 to 10 mol percent

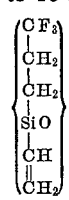

units.

15. The siloxane of claim 1 consisting essentially

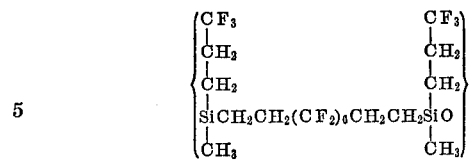

units and

units.

16. A siloxane elastomer comprising (1) a polysiloxane in which essentially all of the units are of the formula

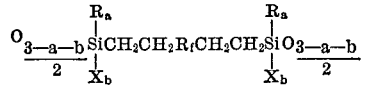

in which:

X is the hydroxy or a hydrolyzable group;

R is independently selected from the group consisting of the hydrogen atom, monovalent hydrocarbon radicals, monovalent halohydrocarbon radicals in which the halogen is Cl, Br or I, and R'CH₂CH₂— radicals in which R' is a perfluoroaliphatic radical;

$R_f$ is selected from the group consisting of perfluoroalkylene radicals, perfluorocycloalkylene radicals and perfluoroalkylene or perfluorocycloalkylene radicals containing one or more C—O—C or C—S—C linkages, said $R_f$ radical containing no more than 20 carbon atoms, and each $a$ has a value of from 0 to 3 inclusive, $b$ has a value of from 0 to 3 inclusive, the sum of all $a$ and $b$ values being no greater than 5; any remaining siloxane units being of the formula

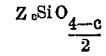

in which:

Z is a hydrogen atom, the hydroxy or a hydrolyzable group, a monovalent hydrocarbon radical, a divalent hydrocarbon radical, a monovalent halohydrocarbon radical in which the halogen is Cl, Br or I or a

R'CH₂CH₂— radical wherein R' is a perfluoroaliphatic radical, and $c$ has a value of from 0 to 3 inclusive; and (2) a filler.

17. The siloxane elastomer of claim 16 wherein said filler is present in an amount in the range of from 5 to 200 parts by weight per 100 parts by weight of said polysiloxane.

18. The siloxane elastomer of claim 17 wherein R is selected from the group consisting of monovalent hydrocarbon and halohydrocarbon radicals having from 1 to 18 inclusive carbon atoms and R'CH₂CH₂— radicals in which:

R' is a perfluoroalkyl radical having from 1 to 10 inclusive carbon atoms;

$R_f$ is a perfluoroalkylene radical having from 1 to 20 inclusive carbon atoms; and Z is a monovalent hydrocarbon or halohydrocarbon radical having from 1 to 18 inclusive carbon atoms.

19. The siloxane elastomer of claim 18 wherein $R_f$ is a perfluoroalkylene radical having from 1 to 6 inclusive carbon atoms.

20. A composition vulcanizable to an elastomer comprising the polysiloxane and filler of claim 17 further characterized as including from 0.1 to 10 weight percent based on the weight of the siloxane of an organic peroxide.

21. The siloxane elastomer of claim 16 wherein $R_f$ is a perfluoroalkylene radical of from 1 to 20 inclusive carbon atoms containing one or more C—O—C or C—S—C linkages.

22. The siloxane elastomer of claim 16 wherein $R_f$ is a perfluorocycloalkylene radical of from 1 to 20 inclusive carbon atoms.

23. The siloxane elastomer of claim 16 wherein $R_f$ is a perfluorocycloalkylene radical of from 1 to 20 inclusive carbon atoms containing one or more C—O—C or C—S—C linkages.

24. The siloxane elastomer of claim 16 consisting essentially of (1) 100 parts by weight of a copolymer of from 90 to 99.9 mole percent of units of the formula

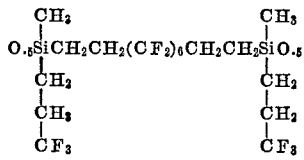

and from 0.1 to 10 mole percent of units of the formula

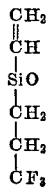

and (2) from 5 to 200 parts by weight of filler.

25. The siloxane elastomer of claim 16 consisting essentially of (1) 100 parts by weight of a copolymer containing from 90 to 99.9 mol percent of units of the formula

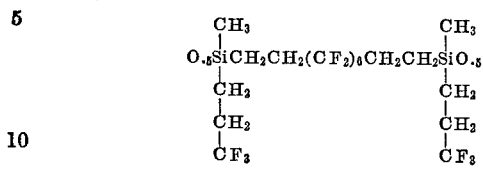

and from 0.1 to 10 mol percent of units of the formula

and (2) 10 to 50 parts by weight of filler.

References Cited
UNITED STATES PATENTS 3,458,554   7/1969   Haluska _____ 260—448.2
3,542,830   11/1970  Kim et al. _____ 260—448.2

DONALD E. CZAJA, Primary Examiner

M. I. MARQUIS, Assistant Examiner

U.S. Cl. X.R.

252—49.6 R; 260—18 S, 45.7 R, 45.75 R, 46.5 E, 46.5 G, 46.5 P, 46.5 UA, 448.2 D, 825 R